(12) United States Patent
Royer

(10) Patent No.: US 7,506,912 B2
(45) Date of Patent: Mar. 24, 2009

(54) DEVICE FOR MAINTAINING A TARPAULIN IN A TAUT STATE

(76) Inventor: Réal Royer, 5735, rue Barré, Saint-Hyacinthe, Quebec (CA) J2R 1E4

( * ) Notice: Subject to any disclaimer, the term of this patent is extended or adjusted under 35 U.S.C. 154(b) by 0 days.

(21) Appl. No.: 11/603,021

(22) Filed: Nov. 22, 2006

(65) Prior Publication Data

US 2008/0116709 A1    May 22, 2008

(51) Int. Cl.
*B60J 11/00* (2006.01)
(52) U.S. Cl. ........................................ 296/98
(58) Field of Classification Search ............ 296/98, 296/100.15; 160/315
See application file for complete search history.

(56) References Cited

U.S. PATENT DOCUMENTS

| | | | |
|---|---|---|---|
| 5,002,328 A | 3/1991 | Michel | |
| 5,328,228 A | 7/1994 | Klassen | |
| 6,513,856 B1 * | 2/2003 | Swanson et al. | 296/98 |
| 2002/0021018 A1 | 2/2002 | Royer | |
| 2003/0090124 A1 * | 5/2003 | Nolan et al. | 296/98 |

FOREIGN PATENT DOCUMENTS

GB    2 401 086    11/2004

* cited by examiner

*Primary Examiner*—Joseph D Pape

(57) ABSTRACT

A device for maintaining a tarpaulin in a substantially taut state over a top aperture of a container, the tarpaulin being configurable between an extended configuration and a retracted configuration, wherein, in the extended configuration, the tarpaulin substantially covers the top aperture, and in the retracted configuration, the tarpaulin is substantially retracted from the top aperture. The device includes a rod for rolling the tarpaulin therearound when configuring the tarpaulin from the extended configuration to the retracted configuration and for unrolling the tarpaulin therefrom when configuring the tarpaulin from the retracted configuration to the extended configuration, the rod defining a longitudinal axis; and a biasing element mechanically coupled to both the container and the rod for biasing the rod in such a manner so as to maintain the tarpaulin in a substantially taut state when the tarpaulin is being rolled and unrolled respectively onto and from the rod.

11 Claims, 4 Drawing Sheets

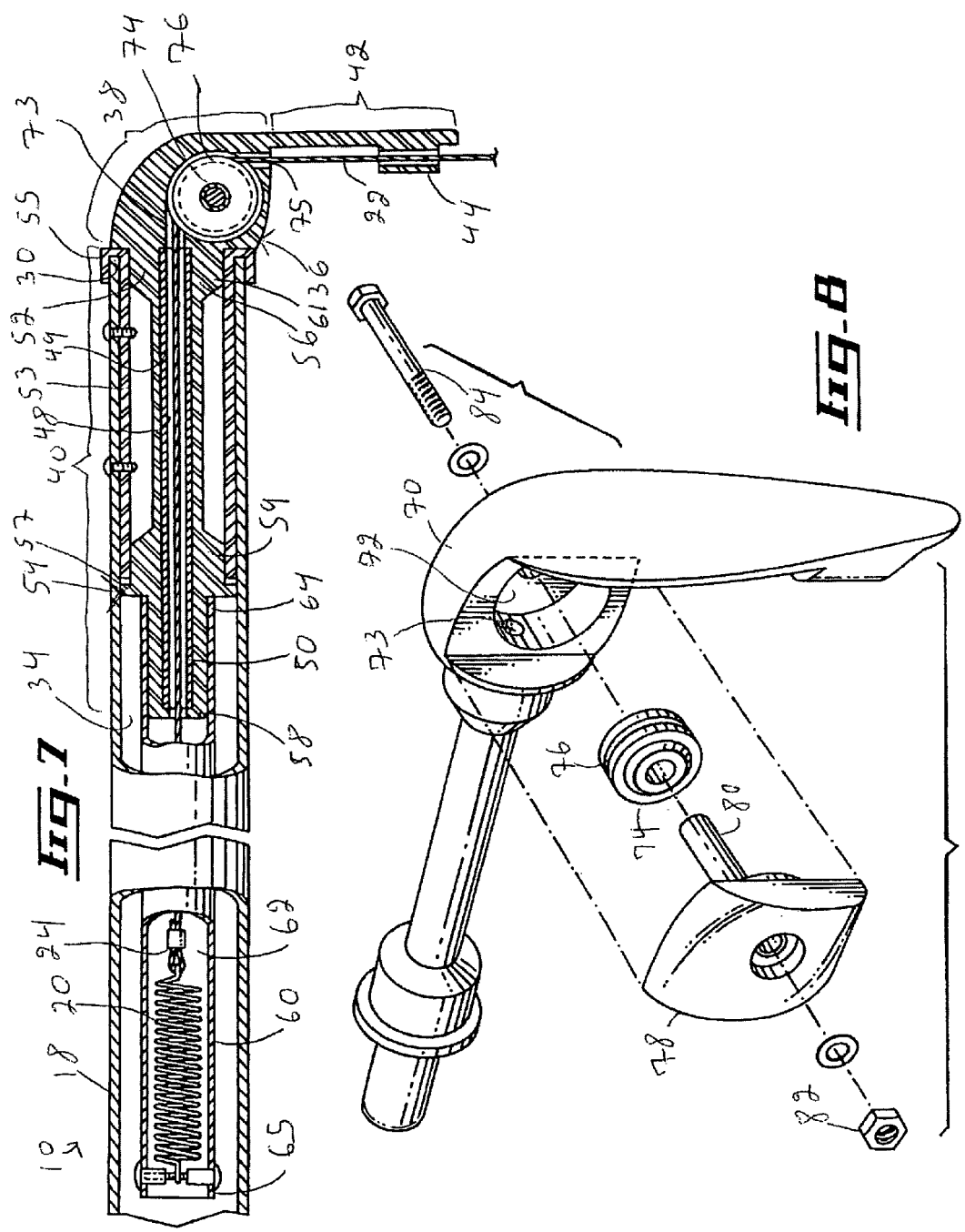

DEVICE FOR MAINTAINING A TARPAULIN IN A TAUT STATE

FIELD OF THE INVENTION

The present invention relates generally to tarpaulins. More specifically, the present invention is concerned with a device for maintaining a tarpaulin in a taut state.

BACKGROUND OF THE INVENTION

Vehicle cargo containers for transporting bulk material such as sawdust, gravel chip, cutter shavings and the like typically include open top boxes such as semi-trailers or the like defining side walls, a front wall, a rear wall and a floor. These open top containers are typically mechanically coupled to various types of vehicles such as cargo ships, railway carts and truck cabins for transporting goods between various locations.

During transportation in these so-called open top containers, there exists a substantial risk that a portion of the load may be blown out of the open top container by various physical phenomena such as vibration, aerodynamically created vacuum, wind or the like. If some of the load is accidentally blown out of the container it may potentially not only cause unnecessary wastage of the transported goods but may also create a dangerous situation.

For example, when the open-top container is attached to a truck cabin, some of the load accidentally blown out of the container may contaminate the road or highway as it whirls around thus causing dangerous ground road conditions. It may also be blown directly towards the windshield of following vehicles creating a potentially disastrous situation.

Accordingly, in many areas, regulations have been implemented for the carriage of various loads, particularly on public highways requiring that open top containers be provided with some type of covering structure for covering the loading aperture during transport. With the increasing number of accidents, these official requirements have become more and more stringent, sometimes requiring adequate coverage for the load on even short journeys.

Consequently, there has been an industry wide move to provide permanently installed flexible covers often referred to as tarpaulins or tarps that can be quickly rolled and unrolled by the driver so as to respectively allow selective uncovering and covering of the load. When these permanently installed tarpaulins are used only occasionally they may be stored on the vehicle in a folded condition and unfolded over the body as and when required.

Various configurations of tarpaulins have been proposed. However, two configurations have proven to be particularly popular. One such configuration is the so called end-rolled tarpaulin which is gathered at one of the longitudinal ends of the container when not in use and moved along the body of the container between operative and stored positions.

The end-rolled tarpaulins are typically gathered at the front end of the vehicle and are usually provided along their length with a number of transverse supporting bars which extend between the two longer side walls of the container. The end-rolled tarpaulins are typically moved by means of a pair of cables trained over pulleys and carrying the tarpaulins with them as they move. With such an arrangement, the movement of the tarpaulin typically moves the bows automatically out of the way so that the latter do not obstruct the re-loading through the top opening. The movement of the bows out of the way also reduces the risks of having the latter damaged by a new load.

The other type of permanently installed tarpaulins preferred by some haulers is commonly referred to as a side-load tarpaulin. The side-load tarpaulins typically, permanently extend the full length of the container body and are rolled and unrolled about a so-called rolling rod that also typically extends the full length of the container body.

Rolling the tarpaulin around the rolling rod may cause the formation of folds in the tarpaulin, as the tarpaulin is typically not stretched during this operation. These folds cause the rolled tarpaulin to take a relatively large amount of space around the rolling rod as the folds create gaps in the rolled tarpaulin.

In addition, the folds induce mechanical stresses in the rolled tarpaulin, which reduces the useful life of the tarpaulin as the tarpaulin may then be weakened. In some cases, if a tarpaulin including a fold is rolled relatively tightly around the rolling rod, the tarpaulin may even be torn at the fold location.

Against this background, there exists a need in the industry to provide a novel device for maintaining a tarpaulin in a taut state.

An object of the present invention is therefore to provide a device for maintaining a tarpaulin in a taut state.

SUMMARY OF THE INVENTION

In a first broad aspect, the invention provides a device for maintaining a tarpaulin in a substantially taut state over a top aperture of a container, the tarpaulin being configurable between an extended configuration and a retracted configuration, wherein, in the extended configuration, the tarpaulin substantially covers the top aperture, and in the retracted configuration, the tarpaulin is substantially retracted from the top aperture. The device includes:
  a rod for rolling the tarpaulin therearound when configuring the tarpaulin from the extended configuration to the retracted configuration and for unrolling the tarpaulin therefrom when configuring the tarpaulin from the retracted configuration to the extended configuration, the rod defining a longitudinal axis; and
  a biasing element mechanically coupled to both the container and the rod for biasing the rod in such a manner so as to maintain the tarpaulin in a substantially taut state when the tarpaulin is being rolled and unrolled respectively onto and from the rod.

Advantageously, the device reduces or eliminates the presence of folds in the tarpaulin when the tarpaulin is rolled around the roll. Therefore, the rolled tarpaulin in the retracted configuration is relatively compact. A reduction in the number of folds present in the rolled tarpaulin also extends the useful like of the tarpaulin as such folds have a tendency to weaken and damage the tarpaulin. The device is also relatively inexpensive to manufacture and relatively easy to use.

In some embodiments of the invention, the biasing element includes a spring component located at within the rod. The spring component is mechanically coupled to the container through a wire. The wire extends substantially longitudinally, at least in part, within the rod and extends substantially perpendicularly to the rod longitudinal axis outside the rod.

In some embodiments of the invention, the device includes a wire redirecting portion for changing an orientation of the wire. The wire redirecting portion is rotatably coupled to the rod so as to allow rotation of the wire redirecting portion relative to the longitudinal axis of the rod.

In another broad aspect, the invention provides a method for configuring a tarpaulin between an extended configuration and a retracted configuration, wherein, in the extended configuration, the tarpaulin substantially covers a top aperture of a container, and in the retracted configuration, the tarpaulin is substantially retracted from the top aperture, the tarpaulin being rollable around a rod, said method comprising:

rolling the tarpaulin around the rod to configure the tarpaulin from the extended configuration to the retracted configuration;

maintaining the tarpaulin in a substantially taut state over the top aperture of the container as the tarpaulin is rolled around the rod from the extended configuration to the retracted configuration.

In another broad aspect, the invention provides a device for maintaining a tarpaulin in a substantially taut state over a top aperture of a container, the tarpaulin being configurable between an extended configuration and a retracted configuration, wherein, in the extended configuration, the tarpaulin substantially covers the top aperture, and in the retracted configuration, the tarpaulin is substantially retracted from the top aperture. The device includes:

rolling means for rolling the tarpaulin therearound when configuring the tarpaulin from the extended configuration to the retracted configuration and for unrolling the tarpaulin therefrom when configuring the tarpaulin from the retracted configuration to the extended configuration; and biasing means mechanically coupled to both the container and the rolling means for biasing the rolling means in such a manner so as to maintain the tarpaulin in a substantially taut state when the tarpaulin is being rolled and unrolled respectively onto and from the rolling means.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 7, in a side cross-sectional view, illustrates the device of FIG. 1; and

FIG. 8, in an exploded view, illustrates the wire guide of FIG. 6.

DETAILED DESCRIPTION

Figure 1:
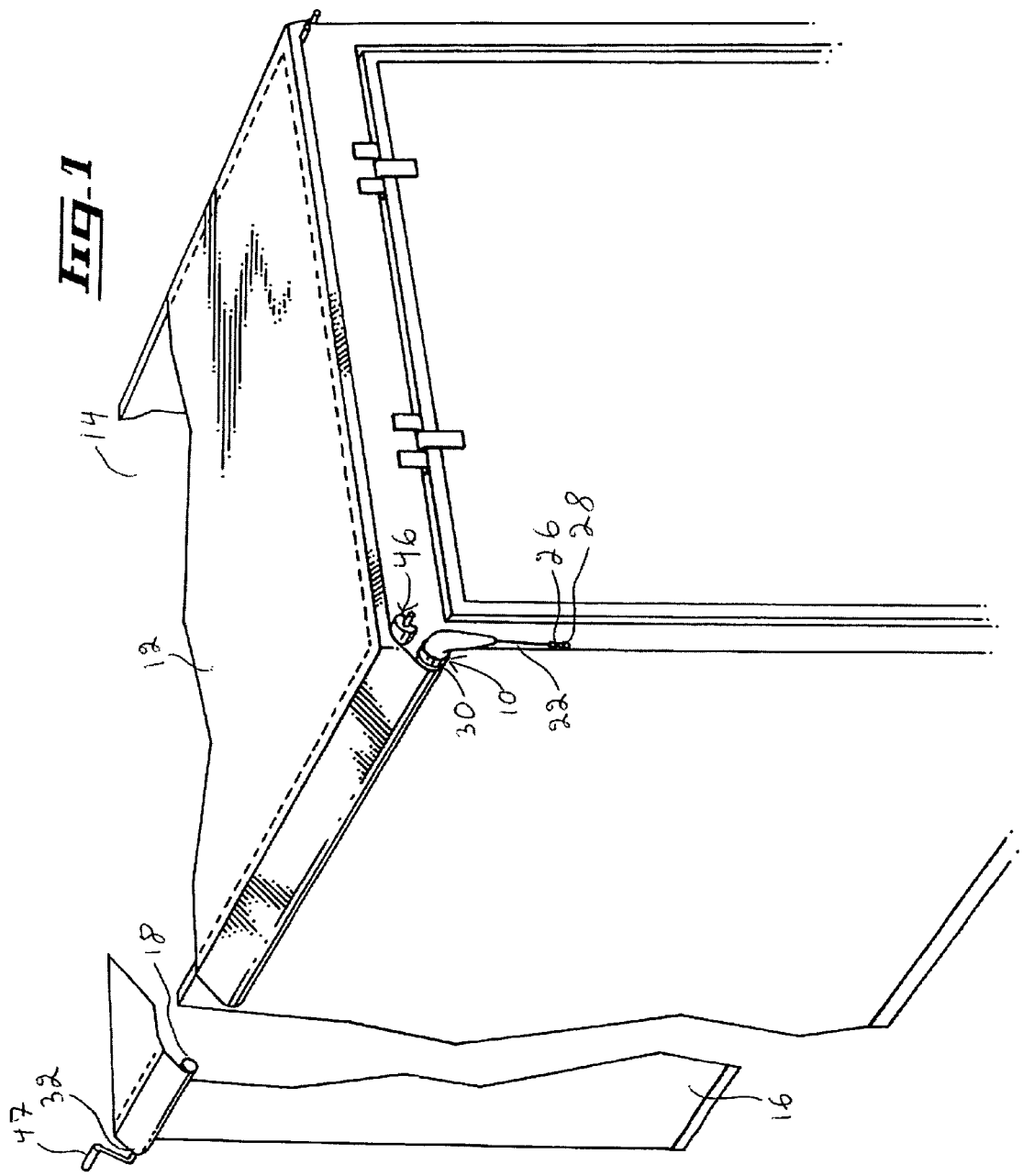
FIG. 1, in a perspective view, illustrates a device for maintaining a tarpaulin in a substantially taut state over a top aperture of a container according to an embodiment of the present invention.

FIG. 1 illustrates a device 10 for maintaining a tarpaulin 12 in a substantially taut state over a top aperture 14 of a container 16. The tarpaulin 12 is configurable between an extended configuration, shown in FIGS. 1 and 2, and a retracted configuration, shown in FIG. 5. In the extended configuration, the tarpaulin 12 substantially covers the top aperture 14. In the retracted configuration, the tarpaulin 12 is substantially retracted from top aperture 14. In some embodiments of the invention, as shown in the drawings, the tarpaulin 12 is secured to the container 16.

For the purpose of this specification, the term tarpaulin refers to tarpaulin per se and to any other types of fabric, web or mesh that is stretchable over the top aperture 14 of the container 16. The container 16 is any suitable container, such as, for example, the body of a dump truck (not shown in the drawings).

Referring to FIG. 1, the device 10 includes a rod 18 for rolling the tarpaulin 12 therearound when configuring the tarpaulin 12 from the extended configuration to the retracted configuration. The tarpaulin 12 is unrolled from the rod 18 when configuring the tarpaulin 12 from the retracted configuration to the extended configuration. A biasing element, shown in FIG. 7, is mechanically coupled both to the container 16 and to the rod 18 for biasing the rod 18 in such a manner so as to maintain the tarpaulin 12 in a substantially taut state over the top aperture 14.

In alternative embodiments of the invention, a device substantially similar to the device 10 includes rolling means for rolling the tarpaulin 12 therearound when configuring the tarpaulin 12 from the extended configuration to the retracted configuration. The tarpaulin 12 is unrolled from the rolling means when configuring the tarpaulin 12 from the retracted configuration to the extended configuration. Biasing means are mechanically coupled to the container 16 and to the rolling means for biasing the rolling means to maintain the tarpaulin 12 in a substantially taut state over the top aperture 14.

In some embodiments of the invention, the biasing element has a substantially elongated configuration, at least a portion of the biasing element being resiliently longitudinally extendable so as to allow this portion of the biasing element to stretch as the tarpaulin 12 is configured in the retracted configuration and resiliently spring back as the tarpaulin 12 is configured in the extended configuration.

For example, as seen in FIG. 7, in some embodiments of the invention, the biasing element includes a wire 22 extending from a spring component 20. The wire 22 defines a wire proximal end 24 (seen in FIG. 7) substantially adjacent the spring component 20 and an opposed wire distal end 26 (seen in FIG. 1), the wire distal end 26 being attachable to the container 16 at a container attachment location 28.

However, in alternative embodiments of the invention, the spring component 20 is absent from the device 10. Instead, the biasing element includes a resilient wire, such as for example a bungee cord.

Referring to FIG. 1, the rod 18 defines a rod first end 30 and a rod second end 32 substantially longitudinally opposed to the rod first end 30. A rod passageway 34, seen in FIG. 7, extends within the rod 18 from the rod first end 30 towards the rod second end 32. In some embodiments of the invention, the rod passageway 34 extends from the rod first end 30 to the rod second end 32. However, in alternative embodiments of the invention, the rod passageway 34 ends at a location intermediate the rod first end 30 and the rod second end 32.

The reader skilled in the art will readily appreciate that although the drawings only show one spring component 20 and one wire 22, it is within the scope of the invention to have devices similar to the device 10 that include more than one spring component 20 and more than one wire 22. For example, in some embodiments of the invention, a device similar to device 10 includes two spring components 20 and two wires 22, each of the wires 22 exiting from the rod passageway 34 at a respective one of the rod first and second ends 30 and 32.

The spring component 20 is provided within the rod passageway 34. In some embodiments of the invention, the spring component 20 includes a coil spring. However, in alternative embodiments of the invention, the spring component 20 includes any other suitable component.

The device 10 includes a decoupling assembly for mechanically linking the biasing element to the rod 18 while allowing the rod 18 to roll about the longitudinal axis independently of the biasing element.

For example, referring to FIG. 7, the device 10 includes a wire guide 36 secured to the rod 10 substantially adjacent the rod first end 30. The wire guide 36 includes a wire redirecting portion 38 for changing an orientation of the wire 22. The wire 22 extends substantially longitudinally between the spring component 20 and the wire redirecting portion 38. The wire 22 extends substantially perpendicularly to the longitudinal axis of the rod 18 from the wire redirecting portion 38 towards the wire second end 26.

The wire guide 36 further includes the decoupling assembly in the form of a rod coupling portion 40 for coupling the wire guide 36 to the rod 18. The rod coupling portion 40 is rotatably mounted to the rod 18 for allowing a rotation of the wire redirecting portion 38 about the longitudinal axis of the rod 18.

The wire guide 36 further includes a lever 42 extending substantially radially outwardly from the wire redirection portion 38. The lever 42 defines a lever wire guide 44 for maintaining the wire 22 in a substantially radial orientation between the wire redirecting portion 38 and the lever guide 44.

Referring to FIG. 1, the device 10 further includes a wire support 46 extending from the container 16. The wire support 46 supports the wire 22 over the aperture 14 when the tarpaulin is in the retracted configuration.

Also, the device 10 includes an actuator 47 for respectively rolling and unrolling the tarpaulin 12 onto and from the rod 18. For example, the actuator 47 includes a crank or a motor, among other possibilities.

Referring to FIG. 7, the rod coupling portion 40 includes a substantially longitudinal coupling portion tube 49 provided within the rod passageway 34. The coupling portion tube 49 defines a coupling portion passageway 48 extending therethrough. The coupling portion passageway 48 receives the wire 22 therethrough. The coupling portion tube defines a coupling portion tube first end 56 and a longitudinally opposed coupling portion tube second end 58.

In some embodiments of the invention, a reinforcement tube 50 is provided within the coupling portion passageway 48 for reinforcing the coupling portion tube 49. However, in alternative embodiments of the invention, there is no reinforcement tube 50.

First and second coupling flanges 52, and 54 extend substantially radially outwardly from the coupling portion tube 49 for supporting the coupling portion tube 49 within the rod passageway 34. The first coupling flange 52 is provided substantially adjacent the coupling portion tube first end 56. The second coupling flange 54 extends at a location intermediate the coupling portion tube first and second ends 56 and 58.

In some embodiments of the invention, the first and second coupling flanges 52 and 54 include a material presenting a relatively low friction coefficient with the material composing the rod 18. For example, the rod 18 may include a metal and the first and second coupling flanges 52 and 54 may include a material such as Nylon™ that allows the coupling tube 48 to rotate relatively easily within the rod passageway 34.

In the embodiment of the invention shown in the drawings, a substantially cylindrical sleeve 53 defining a cuff 55 at an end thereof is used to mount the rod coupling portion 40 in the rod passageway 34. The sleeve 53 is located in the rod passageway 34 and secured to the rod 18. The cuff 55 covers the rod first end 30.

The following configuration ensures that the rod coupling portion 40 remains mounted within the rod 18. The reader skilled in the art will readily appreciate that in alternative embodiments of the invention, the rod coupling portion 40 is mounted within the rod 18 in any other suitable manner.

The second coupling flange 54 includes a second flange first tier 57 and a second flange second tier 59. The second flange first tier 57 is of a diameter substantially equal to the interior diameter of the rod passageway 34. The second flange second tier 59 is of a diameter substantially equal to the interior diameter of the sleeve 53 and is located between the second flange first tier 57 and the first coupling flange 56. The first coupling flange 55 includes a sleeve contacting portion 61 that has a diameter substantially equal to the interior diameter of the sleeve 53, and the wire redirecting portion 18 extends radially over a distance substantially larger than the interior radius of the sleeve 53.

The sleeve 55 is provided between the second flange first tier 57 and the wire redirecting portion 38. The second flange second tier 59 and the sleeve contacting portion 61 support the rod coupling portion 40 within the sleeve 53 and the second flange first tier 57 supports the rod coupling portion 40 within the rod 18.

The spring component 20 is provided within a spring component mounting tube 60 extending substantially longitudinally within the rod passageway 34. For example, the spring component mounting tube 60 defines a mounting tube passageway 62 extending therethrough from a mounting tube first end 64 to a mounting tube second end 65.

The mounting tube first end 64 receives the coupling tube 48 therewithin. The second coupling flange 54 defines an abutment surface 68 extending substantially perpendicularly to the longitudinal axis of the rod 18. The mounting tube first end 64 abuts the abutment surface 68.

Referring to FIG. 8, in some embodiments of the invention, the wire redirecting portion 38 includes a body 70. The body 70 defines a body recess 72 receiving thereinto a pulley 74 rotatably mounted to the body 70. The pulley 74 includes a substantially circumferential groove 76 for receiving the wire 22 thereinto, as shown in FIG. 7.

In some embodiments of the invention, the body 70 includes a removable cover 78 to allow access to the body recess 72. The pulley 74 is rotatably mounted within the body recess 72 through an axle 80 secured to the body 70, for example through a nut 82 and a bolt 84.

The body recess 72 defines a first recess aperture 73 in fluid communication with the mounting tube passageway 49 and a second recess aperture extending substantially radially outwardly towards the lever wire guide 44. The wire 22 extends through the mounting tube passageway 49 and through the first recess aperture 73. The circumferential groove 76 receives the wire 22 and redirects it towards the second recess aperture 75 and the lever wire guide 44.

Figure 5:
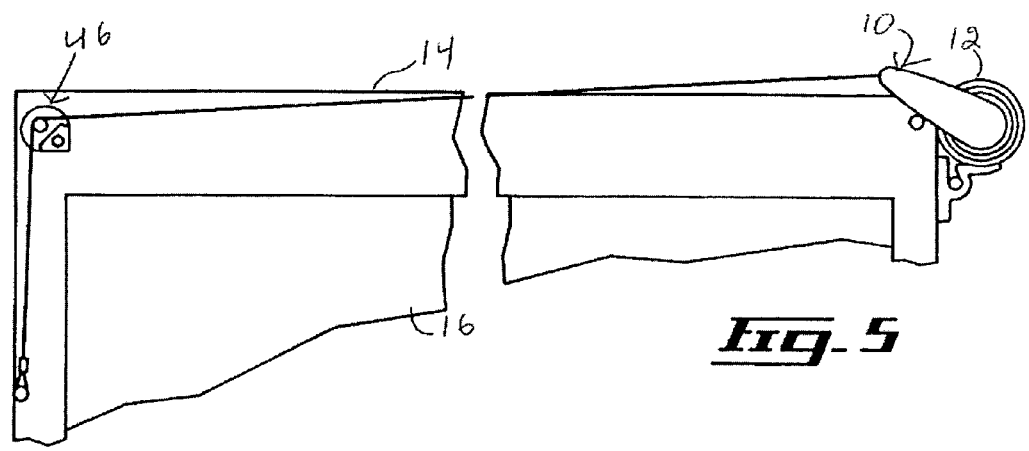
FIG. 5, in a front elevation view, illustrates the device of FIG. 1 in the retracted configuration.
Figure 6:
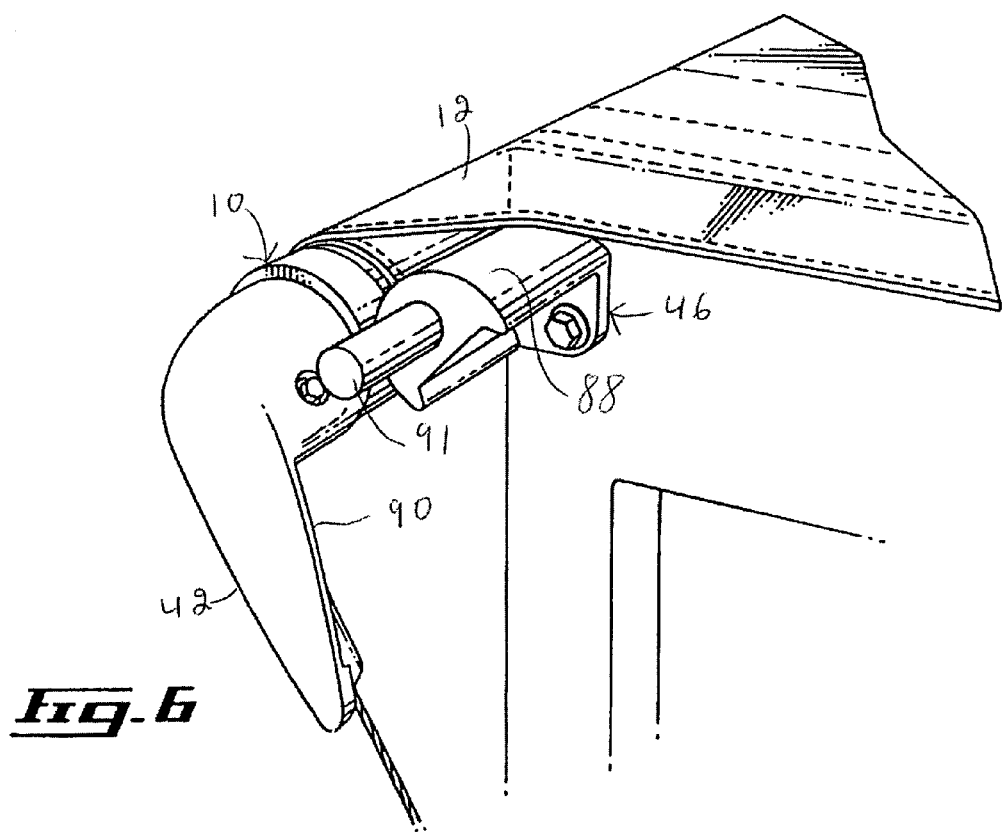
FIG. 6, in a perspective view, illustrates a wire guide included in the device of FIG. 1.

Referring to FIG. 6, the lever 42 includes an abutment surface 90 for abutting the wire support 46. To that effect, the wire support 46 includes a cam 88 for deflecting the lever 90 through the abutment surface 90 sliding onto the cam 88. As seen in FIGS. 2 through 5, and described in further details hereinbelow, the lever 42 is deflected by the cam 88 when the tarpaulin 12 is configured between the extended and the retracted configurations through the cam 88 abutting the abutment surface 90. In some embodiments of the invention, the wire support 46 includes a pin 91 for receiving thereonto the wire 22, as described in further details hereinbelow.

In use, the spring component 20 tensions the wire 22. This results in the spring component mounting tube 60 being biased against the abutment surface 68 and therefore maintains the spring component mounting tube 60 in place relative to the coupling portion tube 49. Also, the tension in the wire 22 biases the wire guide 36 and, therefore, the rod 18, so that the tarpaulin 12 is maintained in a substantially taut state.

Figure 2:
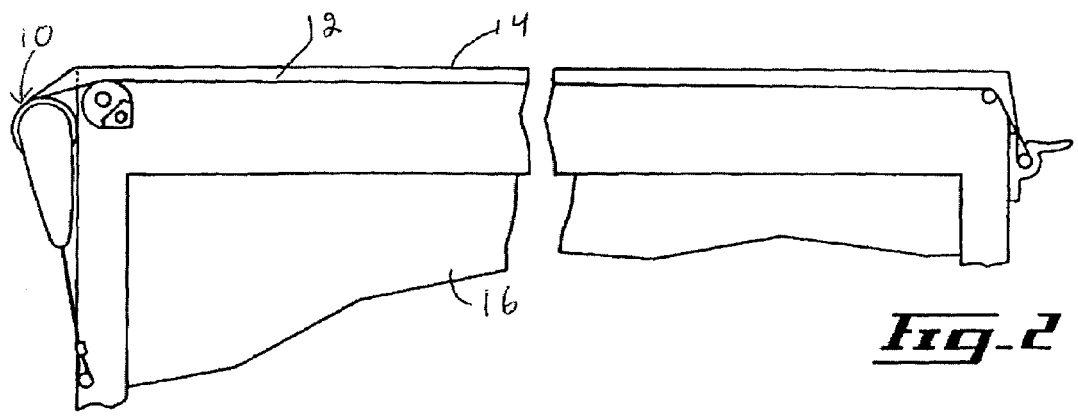
FIG. 2, in a front elevation view, illustrates the device of FIG. 1 in an extended configuration.

The configuration of the tarpaulin 12 from the extended configuration to the retracted configuration is now described with reference to FIGS. 2 through 5. In FIG. 2, the tarpaulin 12 is in the extended configuration. In this configuration, the tarpaulin 12 is maintained in a substantially taut state over the aperture 14 and abuts the wire support 46.

When an intended user uses the actuator 47 (not shown in FIGS. 2 to 5) to rotate the rod 18, the tarpaulin 12 is rolled around the rod 18. This causes the rod 18 to move towards the tarpaulin end that is secured to the container 12. While the rod 18 is rotated by the actuator 47, the wire guide 36 does not rotate with the rod 18. Indeed, since the wire guide 36 is rotatably mounted with respect to the tube 18, the tube 18 may rotate independently from the wire guide 36. This ensures that the wire 22 is not twisted when the device 10 is operated.

Figure 3:
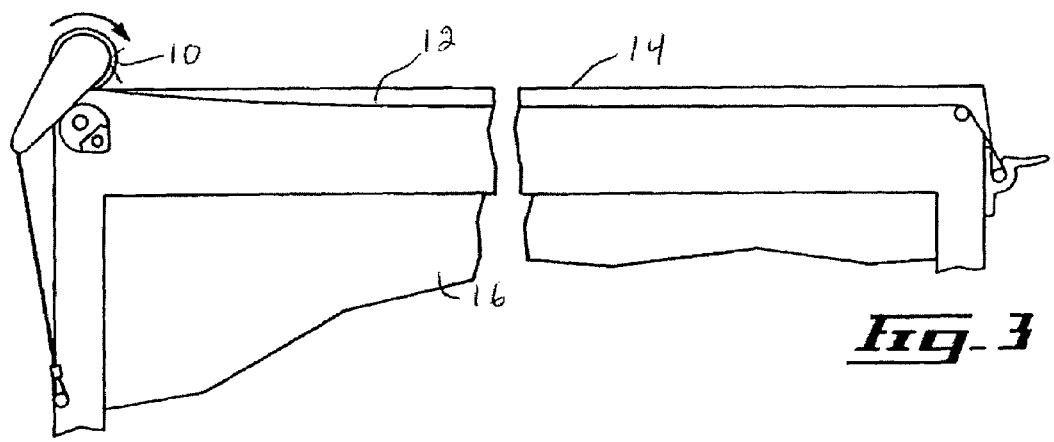
FIG. 3, in a front elevation view, illustrates the device of FIG. 2 in a configuration intermediate the extended configuration and a retracted configuration.
Figure 4:
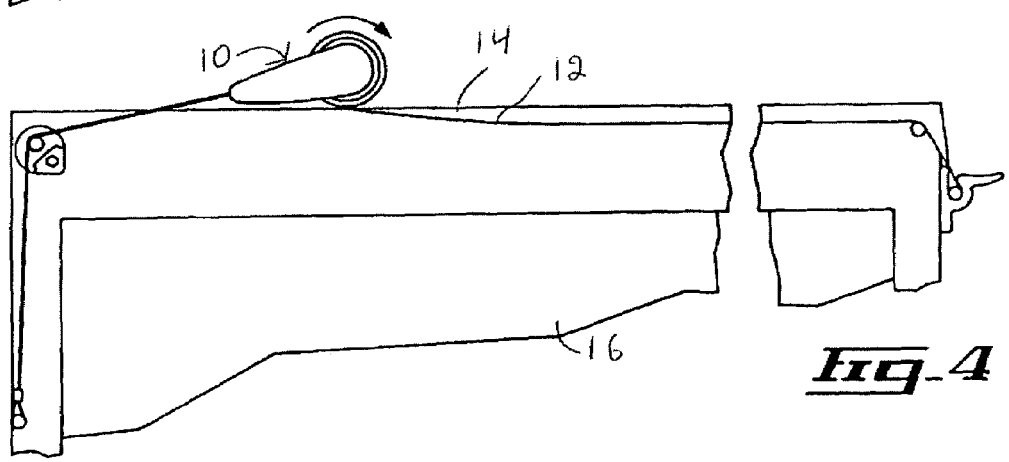
FIG. 4, in a front elevation view, illustrates the device of FIG. 1 in another intermediate configuration between the extended configuration and the retracted configuration.

Referring to FIG. 3, the abutment surface 90 is then brought in contact with the cam 88, which results in the lever 42 to be deflected relatively to the wire support 46. As seen from FIG. 4, when the lever 42 has left the cam 88, the wire 22 is supported by the wire support 46, and more specifically by the pin 91. In this state, the wire 22 and the tarpaulin 12 support the rod 18 above the aperture 14.

Finally, as shown in FIG. 5, when the tarpaulin is in the retracted configuration, the wire 22 extends across the aperture 14 and biases the rod 18 and the tarpaulin 12 rolled therearound towards the container attachment 28. This ensures that, in the retracted configuration, the device 10 and the tarpaulin 12 are still secured to the container 16.

In some embodiments, of the invention, the spring component 20 is selected to maintain a substantially constant tension in the tarpaulin 12 when the tarpaulin 12 is configured between the extended and retracted configurations. This ensures that a predetermined optimal tension may be kept in the tarpaulin 12 at all times. However, in other embodiments of the invention, the spring component 20 does not maintain a substantially constant tension in the tarpaulin 12 when the tarpaulin 12 is configured between the extended and retracted configurations.

Although the present invention has been described hereinabove by way of preferred embodiments thereof, it can be modified, without departing from the spirit and nature of the subject invention as defined in the appended claims.

What is claimed is:

1. A device for maintaining a tarpaulin in a substantially taut state over a top aperture of a container, the tarpaulin being configurable between an extended configuration and a retracted configuration, wherein, in the extended configuration, the tarpaulin substantially covers the top aperture, and in the retracted configuration, the tarpaulin is substantially retracted from the top aperture, said device comprising:

a rod for rolling the tarpaulin therearound when configuring the tarpaulin from the extended configuration to the retracted configuration and for unrolling the tarpaulin therefrom when configuring the tarpaulin from the retracted configuration to the extended configuration, said rod defining a longitudinal axis;

a biasing element mechanically coupled to both the container and said rod for biasing said rod so as to maintain the tarpaulin in a substantially taut state when the tarpaulin is being rolled and unrolled respectively onto and from said rod, said biasing element having a substantially elongated configuration, at least a portion of said biasing element being resiliently longitudinally extendable so as to allow said at least a portion of said biasing element to stretch as the tarpaulin is configured in said retracted configuration and resiliently spring back as the tarpaulin is configured in said extended configuration; and a decoupling assembly for mechanically linking said biasing element to said rod while allowing said rod to roll about the longitudinal axis independently of said biasing element;

wherein said biasing element includes a spring component and a wire, said wire extending from said spring component, said wire defining a wire proximal end substantially adjacent said spring component and an opposed wire distal end said wire distal end being attachable to the container at a container attachment location.

2. A device as defined in claim 1, wherein:

said rod defines a rod first end and a rod second end substantially longitudinally opposed to said rod first end, said rod having a rod passageway extending within said rod from, said rod first end towards said rod second end; and said spring component is provided at least in part within said rod passageway.

3. A device as defined in claim 2, further comprising a wire guide secured to said rod substantially adjacent said rod first end, said wire guide including a wire redirecting portion for changing an orientation of said wire, wherein said wire extends substantially longitudinally between said spring component and said wire redirecting portion; and extends substantially perpendicularly to said longitudinal axis from said wire redirecting portion towards said wire second end.

4. A device as defined in claim 3, wherein said wire guide includes a rod coupling portion for coupling said wire guide to said rod, said rod coupling portion being rotatably mounted to said rod for allowing a rotation of said wire redirecting portion about said longitudinal axis.

5. A device as defined in claim 4, wherein said rod coupling portion includes a substantially longitudinal coupling portion tube inserted into said rod passageway, said rod coupling portion defining a coupling portion passageway extending therethrough, said coupling portion passageway receiving said wire therethrough, said device further comprising a spring component mounting tube, said spring component mounting tube receiving therewithin said spring component, said spring component mounting tube extending from said coupling portion tube.

6. A device as defined in claim 5, wherein said rod coupling portion includes a coupling flange extending substantially radially outwardly from said coupling portion tube for mounting said coupling portion tube within said rod passageway.

7. A device as defined in claim 3, wherein said wire redirecting portion includes a body, said wire redirecting portion including a pulley rotatably mounted to said body, said pulley including a substantially circumferential groove receiving said wire thereinto.

8. A device as defined in claim 7, wherein said wire guide includes a lever extending substantially radially from said wire redirecting portion, said lever defining a lever wire guide for maintaining said wire in a substantially radial orientation between said wire redirecting portion and said lever wire guide.

9. A device as defined in claim 8, further comprising a wire support extending from the container, said wire support supporting the wire to maintain the wire in a substantially taut state over the aperture when the tarpaulin is in the retracted configuration.

10. A device as defined in claim 9 wherein said wire support includes a cam and said lever includes, an abutment surface for abutting said cam, said lever being deflected by said cam when the tarpaulin is configured between the extended and the retracted configurations through said cam abutting said abutment surface.

11. A device as defined in claim 1, further comprising an actuator for rolling the tarpaulin around said rod and for unrolling the tarpaulin from said rod.

* * * * *